United States Patent [19]

Nagase

[11] Patent Number: 6,042,272
[45] Date of Patent: Mar. 28, 2000

[54] ROLLING BEARING WITH A SEALING DEVICE

[75] Inventor: Motohiko Nagase, Kanagawa, Japan

[73] Assignee: NSK Ltd., Tokyo, Japan

[21] Appl. No.: 08/788,076

[22] Filed: Jan. 22, 1997

[30] Foreign Application Priority Data

Jan. 22, 1996 [JP] Japan .................................. 8-008491

[51] Int. Cl.⁷ .................................................. F16C 33/72
[52] U.S. Cl. .................................................. 384/486
[58] Field of Search .................................... 384/477, 481, 384/482, 484, 485, 486

[56] References Cited

U.S. PATENT DOCUMENTS

| | | | |
|---|---|---|---|
| 3,400,989 | 9/1968 | Dixon et al. | 384/482 |
| 3,709,572 | 1/1973 | Pethis | 384/485 X |
| 3,806,212 | 4/1974 | Piva . | |
| 4,525,082 | 6/1985 | Brandenstein et al. | 384/138 |
| 4,526,485 | 7/1985 | Frase et al. | 384/486 |
| 4,639,149 | 1/1987 | Bras et al. | 384/477 |
| 4,697,936 | 10/1987 | Bermond et al. | 384/484 |
| 4,792,242 | 12/1988 | Colanzi et al. | 384/482 |
| 4,792,243 | 12/1988 | Takeuchi et al. | 384/486 |
| 5,042,822 | 8/1991 | Dreschmann et al. | 384/486 X |

FOREIGN PATENT DOCUMENTS

| | | | |
|---|---|---|---|
| 697922 | 11/1964 | Canada | 384/486 |
| 198324 | 4/1986 | European Pat. Off. . | |
| 0248572 | 12/1987 | European Pat. Off. . | |
| 0388258 | 9/1990 | European Pat. Off. . | |
| 0523614 | 1/1993 | European Pat. Off. . | |
| 1175148 | 3/1959 | France . | |
| 1448175 | 6/1966 | France | 384/484 |
| 1450435 | 8/1966 | France | 384/484 |
| 2636691 | 3/1990 | France . | |
| 3616999 | 11/1987 | Germany . | |
| 513748 | 1/1976 | Japan . | |
| 54125340 | 9/1979 | Japan . | |
| 5929420 | 2/1984 | Japan . | |
| 6163017 | 4/1986 | Japan . | |
| 7208486 | 8/1995 | Japan . | |
| 7279977 | 10/1995 | Japan . | |
| 7279978 | 10/1995 | Japan . | |
| 814261 | 1/1996 | Japan . | |
| 1241605 | 8/1971 | United Kingdom . | |
| 2 273 962 | 7/1994 | United Kingdom . | |

*Primary Examiner*—Thomas R. Hannon
*Attorney, Agent, or Firm*—Sughrue, Mion, Zinn, Macpeak & Seas, PLLC

[57] ABSTRACT

In a rolling bearing with a sealing device, first and second flat portions are formed in part of first and second core members constituting seal rings, respectively. The first and second flat portions oppose inner side faces of first and second engaging grooves. By restricting the dimensions of various portions, the seal rings are prevented from being rotated with respect to the shaft or the outer race supporting the seal rings, or from being deviated in the axial direction.

3 Claims, 3 Drawing Sheets

ROLLING BEARING WITH A SEALING DEVICE

BACKGROUND OF THE INVENTION

The present invention relates to a rolling bearing with a sealing device, which is used for constituting a rotary supporting portion which may be splashed with muddy water or the like, such as a wheel supporting portion of an automobile.

A rolling bearing which constitutes a wheel supporting portion of an automobile is required to have a high sealing performance in order to prevent muddy water splashing when the automobile runs, from entering the supporting portion. Conventionally, therefore, a pair of seal rings are disposed in an open end portion of such a rolling bearing so as to configure a double sealing structure, thereby blocking the ingress of muddy water into the rolling bearing. FIG. 3 shows an example of the structure of a prior art rolling bearing with a sealing device which is configured in consideration of such circumstances.

A plurality of balls 5 functioning as rolling elements are disposed between an outer raceway 2 formed in the inner peripheral face of an outer race 1 and an inner raceway 4 formed in the outer peripheral face of a shaft 3 which is a member equivalent to an inner race, thereby enabling the outer race 1 and the shaft 3 to be relatively rotated. A pair of seal rings 6a and 6b are disposed between the inner peripheral face of an end portion of the outer race 1 and the outer peripheral face of an end portion of the shaft 3 so as to be arranged in series in the axial direction (the lateral direction in FIG. 3) of the outer race 1 and the shaft 3, thereby constituting a sealing device 7. The seal rings 6a and 6b are formed into a circular ring-like shape with circular ring-like metal core members 8a and 8b, and elastic members 9a and 9b such as rubber or elastomer reinforced by the metal core members 8a and 8b, respectively.

Among the pair of seal rings 6a and 6b, the first seal ring 6a is disposed in the outer side in the axial direction (the outer side is the side opposing the space outside the rolling bearing, and in the right side of each of the figures) and opposes the external space. The inner peripheral edge of the elastic member 9a constituting the first seal ring 6a is engaged with an engaging groove 10a formed in the outer peripheral face of an end portion of the shaft 3, and the outer peripheral edge slidingly contacts with the inner peripheral face of the outer race 1. The second seal ring 6b is disposed in the inner side in the axial direction (the inner side is the side opposing the rolling elements constituting the rolling bearing, and in the left side of each of the figures) and between the first seal ring 6a and the plural balls 5. The outer peripheral edge of the elastic member 9b constituting the second seal ring 6b is engaged with an engaging groove 10b formed in the inner peripheral face of an end portion of the outer race 1. Two seal lips 11a and 11b are formed on the elastic member 9b. The tip end edge of one seal lip 11a slidingly contacts with the outer peripheral face of the end portion of the shaft 3, and that of the other seal lip 11b slidingly contacts with the inner side face of the metal core member 8a constituting the first seal ring 6a.

In the thus configured prior art rolling bearing with a sealing device, three sliding contact portions shown in (1) to (3) below exist between the external space and the space where the balls 5 are disposed, so as to be arranged in series with respect to the ingress path of muddy water and the like:

(1) the outer peripheral edge of the elastic member 9a and the inner peripheral face of the end portion of the outer race 1;

(2) the tip end edge of the seal lip 11b and the inner side face of the metal core member 8a; and (3) the tip end edge of the seal lip 11a and the outer peripheral face of the end portion of the shaft 3.

Therefore, foreign substances such as muddy water existing in the external space hardly reach the space where the balls 5 are disposed.

In the prior art structure shown in FIG. 3, the engagement portion between the engaging groove 10a formed in the outer peripheral face of the shaft 3 and the inner peripheral edge of the first seal ring 6a, and that between the engaging groove 10b formed in the inner peripheral face of the outer race 1 and the second seal ring 6b do not have a sufficiently large engagement strength. As the outer race 1 and the shaft 3 are relatively rotated, therefore, the first and second seal rings 6a and 6b may be rotated with respect to the shaft 3 or the outer race 1, or deviated in the axial direction of the shaft 3 and the outer race 1.

The rotation of the first and second seal rings 6a and 6b with respect to the shaft 3 or the outer race 1 leads to the reduction of the sealing performance in each of the engagement portions. The deviation of the first and second seal rings 6a and 6b in the axial direction of the shaft 3 and the outer race 1 results in the reduction of the sealing performance in each of the sliding contact portions between the tip end edges of the seal lips constituting the seal rings 6a and 6b and the respective counter faces.

SUMMARY OF THE INVENTION

Under the above-mentioned circumstances, it is an object of the present invention to provide a rolling bearing with a sealing device which can prevent the rotation and the deviation in the axial direction of seal rings which lead to the reduction of the sealing performance, from occurring.

According to the present invention, a rolling bearing with a sealing device comprises a first race member; a second race member being able to rotate relatively to the first race member; a plurality of rolling elements which are disposed between the first race member and the second race member; and a seal unit for sealing an end of the rolling bearing. The seal unit comprises a first seal ring member including a fixed portion of an elastic member fixed to an engaging groove provided in the first race member, a lip portion of an elastic member slidingly contacting with the second race member, and a core plate having a flat portion opposite to an inner side face of the engaging groove of the first race member through the elastic member of the fixed portion; a second seal ring member including a fixed portion of an elastic member fixed to an engaging groove provided in the second race member, a lip portion of an elastic member slidingly contacting with the first race member, and a core plate having a flat portion opposite to an inner side face of the engaging groove of the second race member through the elastic member of the fixed portion of the second seal ring member; and a mutual seal lip member extending from one of the first and second seal ring members to slidingly contact with the other of the first and second seal ring members.

In the thus configured rolling bearing with a sealing device of the invention, in the same manner as the above-mentioned prior art structure, at least three sliding contact portions exist between the external space and the space where the rolling elements are disposed, so as to be arranged in series with respect to the ingress path of foreign substances such as muddy water. Therefore, foreign substances existing in the external space hardly reach the space where the rolling elements are disposed.

In the rolling bearing with a sealing device of the invention, moreover, the first and second seal ring members are not rotated with respect to the first and second engaging grooves, nor deviated in the axial direction of the first race member and the second race member. Therefore, the reduction of the sealing performance which may occur as a result of the rotation or the deviation in the axial direction of the seal ring members can be effectively prevented from occurring.

Especially, the core plate is made to have the flat portion opposite to the inner side face of the engaging groove. The flat portion can be easily processed with high precision, so that it is easy to design the core plate so as to be stably fixed in the fixed portion.

DETAILED DESCRIPTION OF THE INVENTION

Figure 1:
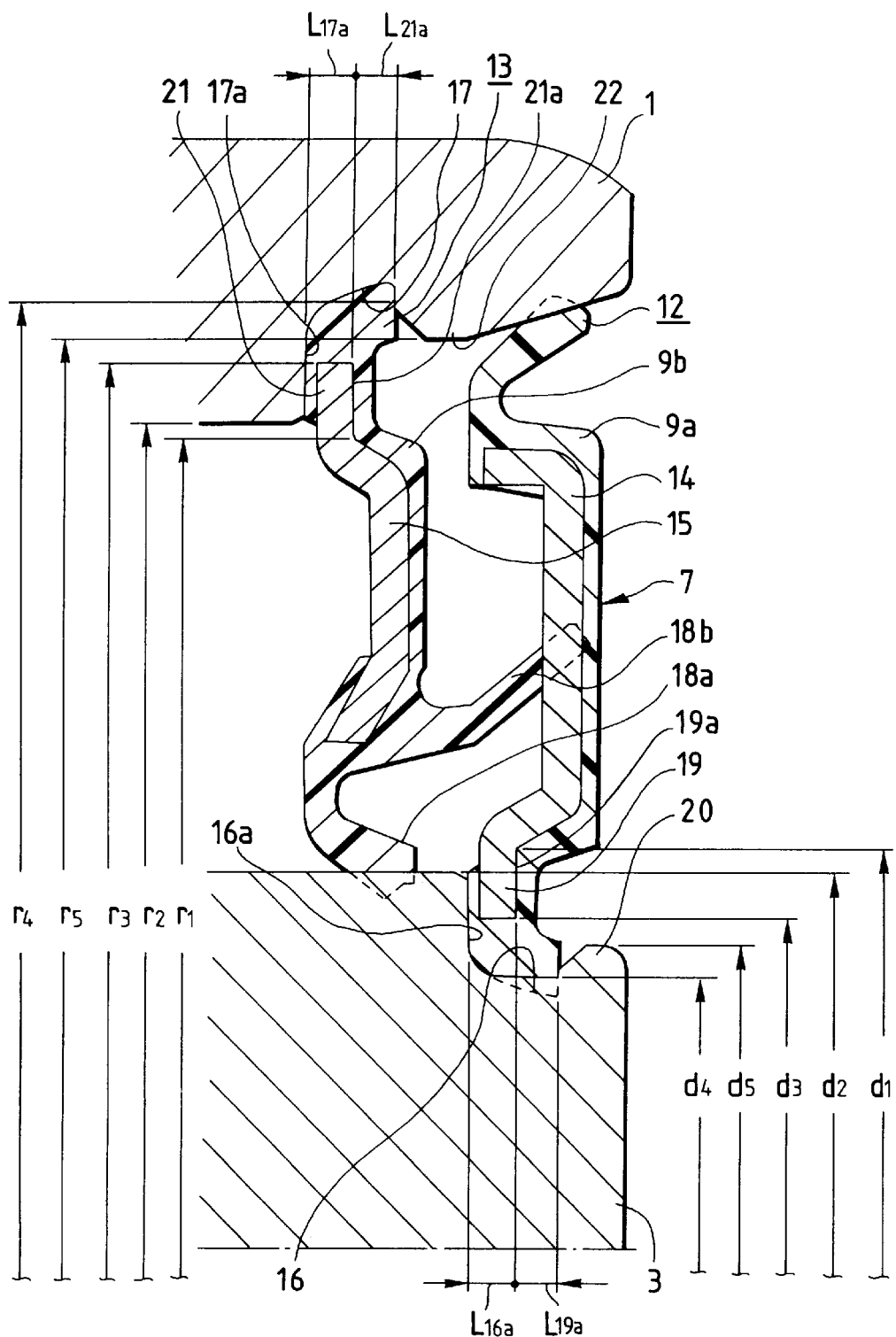
FIG. 1 is a partial sectional view showing a first embodiment of the invention.
Figure 3:
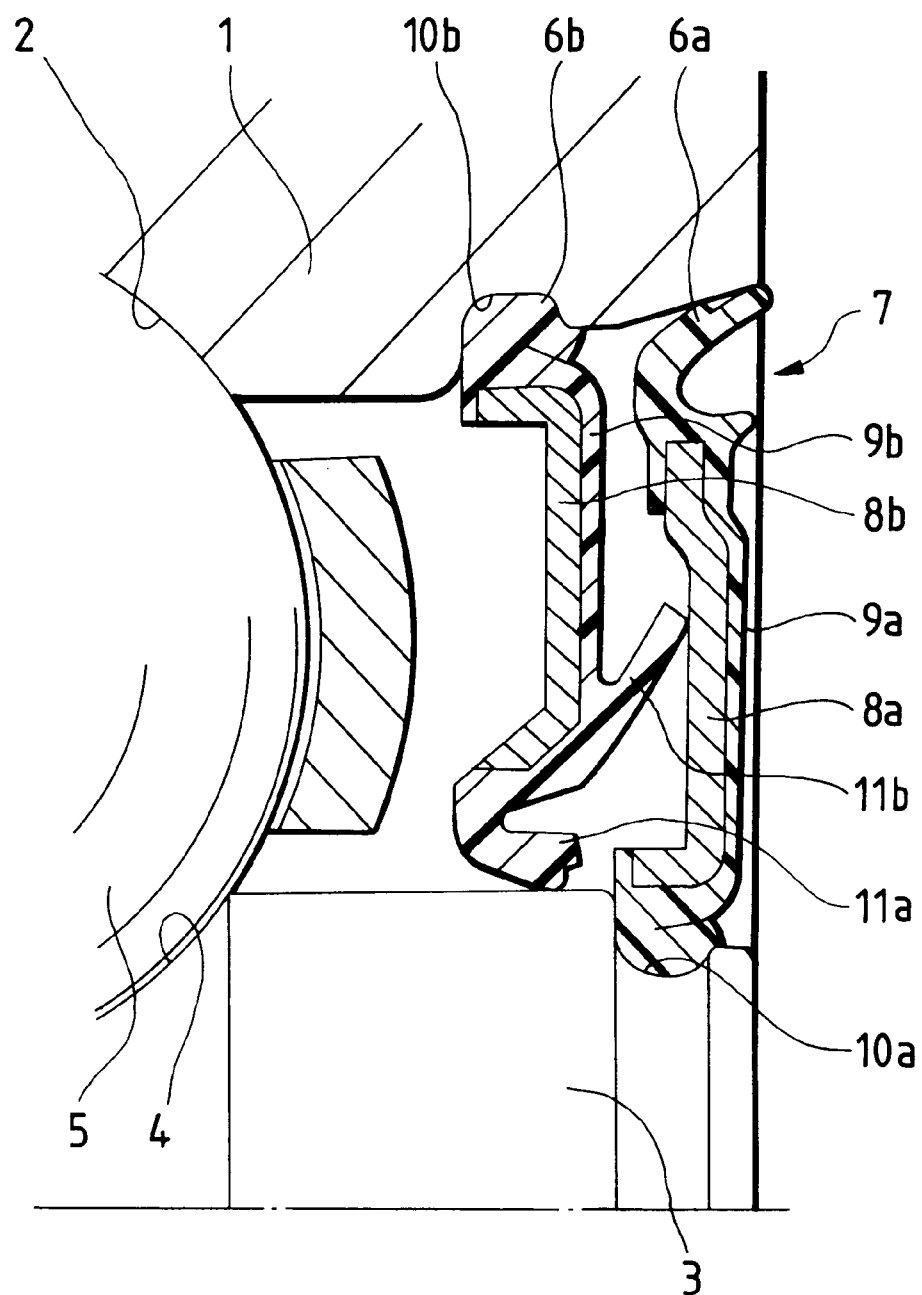
FIG. 3 is a partial sectional view showing an example of a prior art structure.

FIG. 1 shows a first embodiment of the invention. A plurality of balls 5 functioning as the rolling elements are disposed between an outer raceway 2 formed in the inner peripheral face of an outer race 1 and an inner raceway 4 formed in the outer peripheral face of a shaft 3 which is the inner race equivalent member (regarding the outer raceway 2, the inner raceway 4, and the balls 5, see FIG. 3). When a wheel for an automobile is to be rotatably supported by a suspension system, for example, the outer race 1 is supported and fixed to the suspension system, and the wheel is supported by the vicinity of an end portion of the shaft 3. It is a matter of course that, in place of the shaft 3, an inner race may be used as the inner race equivalent member and the inner race is fitted onto and fixed to the shaft.

First and second seal rings 12 and 13 are disposed between the inner peripheral face of an end portion of the outer race 1 and the outer peripheral face of the end portion of the shaft 3 so as to be arranged in series in the axial direction (the lateral direction in FIG. 1) of the outer race 1 and the shaft 3. The seal rings 12 and 13 are formed into a circular ring-like shape with first and second metal core members 14 and 15 which are formed into a circular ring-like shape, and elastic members 9a and 9b which are reinforced by the metal core member 14 and 15, respectively.

Between the first and second seal rings 12 and 13, the first seal ring 12 is disposed in the outer side in the axial direction (the right side of FIG. 1) and opposes the external space. The inner peripheral edge of the elastic member 9a constituting the first seal ring 12 is engaged with a first engaging groove 16 formed in the outer peripheral face of the end portion of the shaft 3. The outer peripheral edge of the elastic member 9a slidingly contacts with the inner peripheral face of the end portion of the outer race 1.

In the rolling bearing with a sealing device of the invention, particularly, a first flat portion 19 is formed in a whole periphery and in an area of the first metal core member 14 constituting the first seal ring 12. The area is toward the inner periphery of the first metal core member. The first flat portion 19 elongates in a direction (the vertical direction in FIG. 1) perpendicular to the center axis of the shaft 3 and reaches the inner peripheral edge of the first seal ring 12. When the outer diameter of the first flat portion 19 is $d_1$, the outer diameter of the shaft 3 is $d_2$, the inner diameter of the first core member 14 is $d_3$, and the diameter of the groove bottom of the first engaging groove 16 (as seen from FIG. 1, the diameter of the groove bottom into which the inner peripheral edge of the elastic member 9a constituting the first seal ring 12 actually enters=the inner diameter of the first seal ring 12 under the engagement state) is $d_4$, the dimensions of the various portions are restricted so as to produce relationships of $d_1 > d_2 > d_3 > d_4$. It is a matter of course that the outer diameter $d_5$ of a flange 20 formed outside the first engaging groove 16 is smaller than the inner diameter $d_3$ of the first metal core member 14, and larger than the diameter $d_4$ of the groove bottom ($d_3 > d_5 > d_4$).

The inner side face 16a of the first engaging groove 16 is parallel with the first flat portion 19, i.e., extends in a direction perpendicular to the center axis of the shaft 3. A part of the elastic member 9a constituting the first seal ring 12 is clamped between the inner side face 16a of the first engaging groove 16 and the first flat portion 19.

A (virtual) plane which passes the center in the width direction (the lateral direction in FIG. 1) of the first engaging groove 16 and which extends in a direction perpendicular to the center axis of the shaft 3 crosses the inner peripheral edge of the first flat portion 19. In other words, when the distance between an extension plane of the outer side face 19a of the first flat portion 19 and the outer end portion of the first engaging groove 16 is $L_{19a}$ and that between the outer side face 19a and the inner side face 16a of the first engaging groove 16 is $L_{16a}$, $L_{19a} < L_{16a}$ is attained.

When the dimensions and shape of the engaging portion for fixing the inner peripheral edge of the first seal ring 12 to the outer peripheral face of the shaft 3 are set in the manner described above, the engaging portion can be configured so as to satisfy following (A), (B), and (C):

(A) the inner peripheral edge portion of the first seal ring 12 is configured by the elastic member 9a, and the elastic member 9a is elastically fitted into the first engaging groove 16;

(B) the inner side face 16a of the first engaging groove 16 and the inner side face of the first metal core member 14 are overlapped with each other in the axial direction, and the elastic member 9a is clamped in the space which exists between these faces and which is not varied in thickness in a diameter direction, and in a state where the elastic member is pressed in the axial direction; and (C) as a result of the fitting of the elastic member 9a into the first engaging groove 16, the reaction force applied in an outward diameter direction in the center portion of the width direction of the first engaging groove 16 acts on the inner peripheral edge of the first core member 14.

When (A), (B), and (C) above are satisfied, the first seal ring 12 is prevented from being rotated with respect to the first engaging groove 16, and from being deviated in the axial direction of the shaft 3, whereby the sealing performance due to the first seal ring 12 can be sufficiently ensured.

On the other hand, the outer peripheral edge of the elastic member 9b constituting the second seal ring 13 which is disposed in the inner side in the axial direction (the left side of FIG. 1) and between the first seal ring 12 and the plural balls 5 is engaged with a second engaging groove 17 formed in the inner peripheral face of the end portion of the outer race 1. Two seal lips 18a and 18b are formed on the elastic member 9b constituting the second seal ring 13. Among the seal lips, the seal lip 18a formed in the inner peripheral edge portion of the elastic member 9b slidingly contacts with an area of the outer peripheral face of the shaft 3. The area is inner in the axial direction than the first engaging groove 16. The tip end edge of the seal lip 18b which is formed in the center portion in a diameter direction of the outer side face of the elastic member 9b, slidingly contacts with the inner side face of the first core member 14 constituting the first seal ring 12. In the figure, the shapes of the seal lips 18a and 18b and the outer peripheral edge portion of the first seal ring 12 which are in the free state, are shown.

In the rolling bearing with a sealing device of the invention, particularly, a second flat portion 21 is formed in a whole periphery and in an area of the second core member 15 constituting the second seal ring 13. The area is toward the outer periphery of the second core member. The second flat portion 21 elongates in a direction perpendicular to the center axis of the outer race 1 and reaches the outer peripheral edge of the second seal ring 13. When the inner diameter of the second flat portion 21 is $r_1$, the inner diameter of the outer race 1 is $r_2$, the outer diameter of the second core member is $r_3$, and the diameter of the groove bottom of the second engaging groove 17 (as seen from FIG. 1, the diameter of the groove bottom into which the outer peripheral edge of the elastic member 9b constituting the second seal ring 13 actually enters=the outer diameter of the second seal ring 13 under the engagement state) is $r_4$, relationships of $r_1<r_2<r_3<r_4$ are attained. It is a matter of course that the inner diameter $r_5$ of a flange 22 formed outside the second engaging groove 17 is larger than the outer diameter $r_3$ of the second core member 15, and smaller than the diameter $r_4$ of the groove bottom ($r_3<r_5<r_4$).

The inner side face 17a of the second engaging groove 17 is parallel with the second flat portion 21, i.e., extends in a direction perpendicular to the center axis of the outer race 1. A part of the elastic member 9b constituting the second seal ring 13 is clamped between the inner side face 17a of the second engaging groove 17 and the second flat portion 21.

A (virtual) plane which passes the center in the width direction of the second engaging groove 17 and which extends in a direction perpendicular to the center axis of the outer race 1 crosses the outer peripheral edge of the second flat portion 21. In other words, when the distance between an extension plane of the outer side face 21a of the second flat portion 21 and the outer end portion of the second engaging groove 17 is $L_{21a}$ and that between the outer side face 21a and the inner side face 17a of the second engaging groove 17 is $L_{17a}$, $L_{21a}<L_{17a}$ is attained.

When the dimensions and shape of the engaging portion for fixing the outer peripheral edge of the second seal ring 13 to the inner periphery of the outer race 1 are set in the manner described above, the engaging portion can be configured so as to satisfy following (D), (E), and (F):

(D) the outer peripheral edge portion of the second seal ring 13 is configured by the elastic member 9b, and the elastic member 9b is elastically fitted into the second engaging groove 17;

(E) the inner side face 17a of the second engaging groove 17 and the inner side face of the second metal core member 15 are overlapped with each other in the axial direction, and the elastic member 9b is clamped in the space which exists between these faces and which is not varied in thickness in a diameter direction, and in a state where the elastic member is pressed in the axial direction; and (F) as a result of the fitting of the elastic member 9b into the second engaging groove 17, the reaction force applied in an outward diameter direction in the center portion of the width direction of the second engaging groove 17 acts on the inner peripheral edge of the second core member 15.

When (D), (E), and (F) above are satisfied, the second seal ring 13 is prevented from being rotated with respect to the second engaging groove 17, and from being deviated in the axial direction of the outer race 1, whereby the sealing performance due to the second seal ring 13 can be sufficiently ensured.

In the thus configured rolling bearing with a sealing device of the invention, the three sliding contact portions exist between the external space where foreign substances such as muddy water exist and the space where the balls 5 are disposed, so as to be arranged in series with respect to the ingress path of the foreign substances. Therefore, foreign substances existing in the external space hardly reach the space where the balls 5 are disposed.

Further, in the rolling bearing with a sealing device of the invention, the first and second seal rings 12 and 13 are securely supported and fixed so as not to be rotated with respect to the shaft 3 and the outer race 1, and so as not to be deviated in the axial direction. Therefore, the sealing performance due to the first and second seal rings 12 and 13 can be sufficiently ensured.

Figure 2:
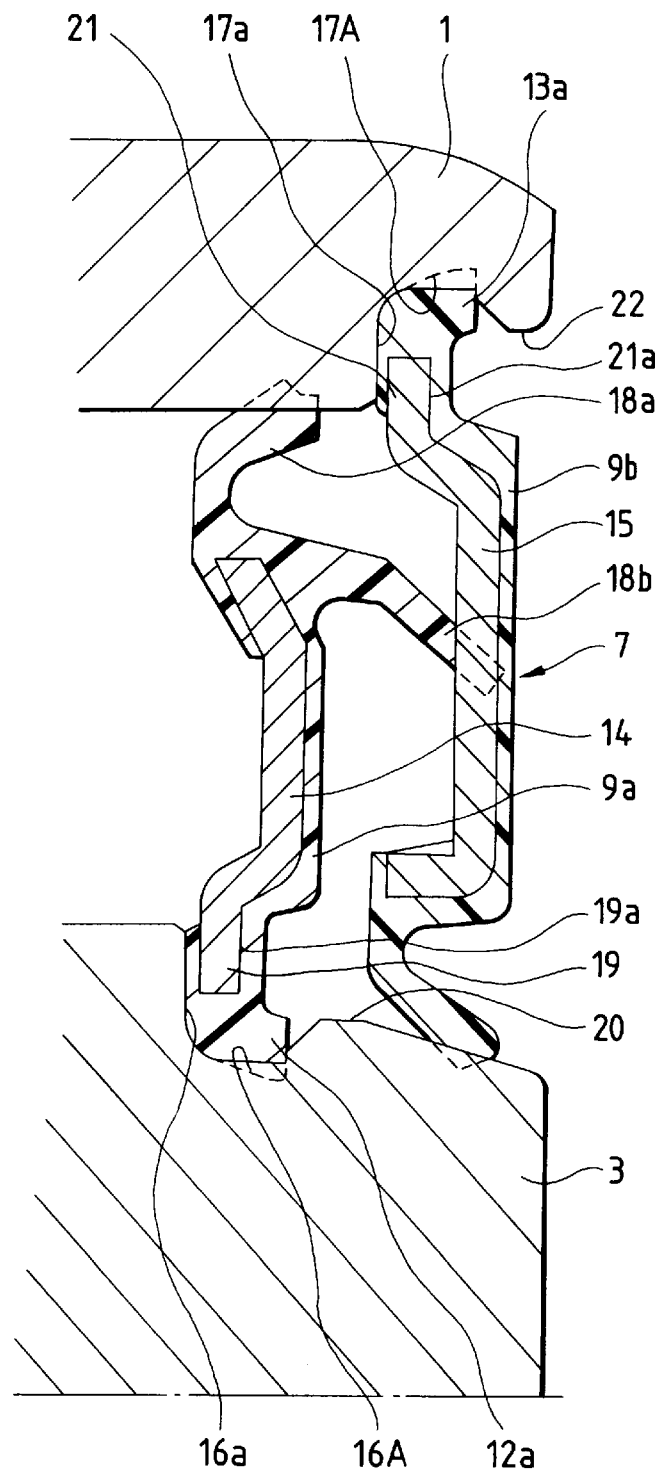
FIG. 2 is a partial sectional view showing a second embodiment of the invention.

FIG. 2 shows a second embodiment of the invention. In the first embodiment, on the premise that the shaft 3 is rotated, the first seal ring 12 which is to be supported and fixed to the outer peripheral face of the shaft 3 is disposed in the outer side, so that the first seal ring 12 opposes the external space. By contrast, in the second embodiment, the invention is applied to a rolling bearing which is used in a state where the shaft 3 is not rotated and instead the outer race 1 is rotated. In the embodiment, therefore, a first seal ring 12a is disposed in the inner side, and the tip end edge of a seal lip 18b disposed on the first seal ring 12a slidingly contacts with the inner side face of the second core material 15 constituting a second seal ring 13a which is disposed in the outer side. The engagement portion between the inner peripheral edge of the first seal ring 12a and a first engaging groove 16A, and that between the outer peripheral edge of the second seal ring 13a and a second engaging groove 17A are configured so as to have the same dimensions and shapes as those of the above-described first embodiment. In summary, both the first and second embodiments are configured so that the seal ring supported by the member which is rotated during use is disposed in the outer side so as to oppose the external space and foreign substances adhering to the outer side face of the seal ring are flown away by centrifugal force. According to this configuration, it is possible to further improve the sealing performance.

The rolling bearing with a sealing device of the invention is configured and operates as described above. Therefore, foreign substances are surely prevented from entering the interior of the rolling bearing, whereby the durability of the rolling bearing can be enhanced.

What is claimed is:

1. A rolling bearing with a sealing device for a wheel, comprising:

an inner race member;

an outer race member being able to rotate relatively to said inner race member;

a plurality of rolling elements which are disposed between said inner race member and said outer race member; and a seal unit for sealing an end of said rolling bearing, said seal unit comprising:

an outside seal ring member including a fixed portion of an elastic member fixed to an engaging groove provided in said inner race member, said engaging groove being formed at an edge portion of an outer circumferential surface of said inner race member, an inner side face located at an inner side of said engaging groove in an axial direction of said inner race member serving as a positioning flat surface, a lip portion of an elastic member slidingly contacting with said outer race member, and a core plate having (i) a plate-like extended portion extended from a bent portion bent in an inside direction of the rolling bearing in a diameter direction of said inner and outer race members, said plate-like extended portion defining a flat portion on a surface thereof, and said flat portion being opposite to said inner side face of said engaging groove of said inner race member through said elastic member of said fixed portion, thereby preventing muddy water from entering an interior of said rolling bearing and (ii) a lip supporting portion for supporting said lip portion, said lip supporting portion being formed by bending an outer end of said core plate in the inside direction of the rolling bearing;

an inside seal ring member including a fixed portion of an elastic member fixed to an engaging groove provided in said outer race member, said engaging grove being formed at an edge portion of an inner circumferential surface of said outer race member, an inner side face located at an inner side of said engaging groove in an axial direction of said outer race member serving as a positioning flat surface, a lip portion of an elastic member slidingly contacting with said inner race member, and a core plate having a plate-like extended portion extended from a bent portion bent in the inside direction of the rolling bearing in said diameter direction, said plate-like extended portion defining a flat portion on a surface thereof, and said flat portion being opposite to said inner side face of said engaging groove of said outer race member through said elastic member of said fixed portion of said inside seal ring member; and a mutual seal lip member extending from one of said outside and inside seal ring members to slidingly contact with the other of said outside and inside seal ring members, wherein said core plate of each of said inside and outside seal ring members is provided with an interposing rubber for positioning and a seal rubber for sealing said engaging groove, and said flat portion of said core plate of each of said inside and outside seal ring members is positioned in the axial direction with respect to the inner side face of said engaging groove while interposing said interposing rubber.

2. A rolling bearing with a sealing device as claimed in claim 1, wherein said inner side face of said engaging groove of said inner race member is parallel with said flat portion of said core plate of said outside seal ring member, a part of said elastic member of said fixed portion of said outside seal ring member being clamped between said inner side face of said engaging groove of said inner race member and said flat portion of said core plate of said outside seal ring member; and said inner side face of said engaging groove of said outer race member is parallel with said flat portion of said core plate of said inside seal ring member, a part of said elastic member of said fixed portion of said inside seal ring member being clamped between said inner side face of said engaging groove of said outer race member and said flat portion of said core plate of said inside seal ring member.

3. A rolling bearing with a scaling device for a wheel, comprising:

an outer race equivalent member having an outer raceway on an inner peripheral face;

an inner race equivalent member having an inner raceway on an outer peripheral face;

a plurality of rolling elements which are disposed between said outer and inner raceways; and outside and inside seal rings each of which is formed into a circular ring-like shape with a circular ring-like core member having a plate-like extended portion extended from a bent portion bent in an inside direction of the rolling bearing in a diameter direction of said inner and outer race equivalent members, said plate-like extended portion defining a flat portion on a surface thereof and an elastic member reinforced by said core member, and which are disposed between said inner peripheral face of said outer race equivalent member and said outer peripheral face of said inner race equivalent member, and arranged in series in an axial direction of said outer race equivalent member and said inner race equivalent member, an inner peripheral edge of said outside seal ring being engaged with a first engaging groove which is formed in said outer peripheral face of said inner race equivalent member, an outer peripheral edge of said outside seal ring slidingly contacting with said inner peripheral face of said outer race equivalent member, an outer peripheral edge of said inside seal ring being engaged with a second engaging groove which is formed in said inner peripheral face of said outer race equivalent member, an inner peripheral edge of said inside seal ring slidingly contacting with said outer peripheral face of said inner race equivalent member, said first engaging groove being formed at an edge portion of an outer circumferential surface of said inner race member, an inner side face located at an inner side of said first engaging groove in an axial direction of said inner race member serving as a positioning flat surface, said second engaging groove being formed at an edge portion of an inner circumferential surface of said outer race member, an inner side face located at an inner side of said second engaging groove in an axial direction of said outer race member serving as a positioning flat surface, a tip end edge of a seal lip disposed on an outer side face of one of said seal rings slidingly contacting with an inner side face of said core member constituting said other seal ring, said one seal ring being disposed in an inner side and opposing said rolling elements, said other seal ring being disposed in an outer side and opposing an external space, wherein said rolling bearing satisfies all of following requirements (1) to (6):

(1) in an area which is toward an inner periphery of a first core member constituting said outside seal ring, a first flat portion of the plate like extended portion of said first core member which elongates in a direction perpendicular to a center axis of said inner race equivalent member and which reaches said inner peripheral edge of said outside seal ring is formed in a whole periphery, and, when an outer diameter of said first flat portion is $d_1$, an outer diameter of said inner race equivalent member is $d_2$, an inner diameter of said first core member is $d_3$, and a diameter of a groove bottom of said first engaging groove is $d_4$, $d_1 > d_2 > d_3 > d_4$;

(2) in an area which is toward an outer periphery of a second core member constituting said inside seal ring, a second flat portion of the plate-like extended portion of said second core member which elongates in a direction perpendicular to a center axis of said outer race equivalent member and which reaches said outer peripheral edge of said second seal ring is formed in a whole periphery, and, when an inner diameter of said second flat portion is $r_1$, an inner diameter of said outer race equivalent member is $r_2$, an outer diameter of said second core ember is $r_3$, and a diameter of a groove bottom of said second engaging groove is $r_4$, $r_1 < r_2 < r_3 < r_4$;

(3) an inner side face of said first engaging groove is parallel with said first flat portion, and a part of said elastic member constituting said outside seal ring is clamped between said inner side face of said first engaging groove and said first flat portion, thereby preventing muddy water from entering an interior of said rolling bearing;

(4) an inner side face of said second engaging groove is parallel with said second flat portion, and a part of said elastic member constituting said inside seal ring is clamped between said inner side face of said second engaging groove and said second flat portion;

(5) a plane which passes a center in a width direction of said first engaging groove and which extends in a direction perpendicular to said center axis of said inner race equivalent member crosses an inner peripheral edge of said first flat portion; and (6) a plane which passes a center in a width direction of said second engaging groove and which extends in a direction perpendicular to said center axis of said outer race equivalent member crosses an outer peripheral edge of said second flat portion, and wherein said core member of each of said inside and outside seal ring members is provided with an interposing rubber for positioning and a seal rubber for sealing said engaging groove, and said flat portion of said core member of each of said inside and outside seal ring members is positioned in the axial direction with respect to the inner side face of said engaging groove while interposing said interposing rubber.

* * * * *